United States Patent [19]

Rosenzweig

[11] Patent Number: 4,858,293
[45] Date of Patent: Aug. 22, 1989

[54] METHOD OF FORMING A BEARING BY DIMENSIONAL RECOVERY OF A RACE OR ROLLING ELEMENT

[75] Inventor: Nachum Rosenzweig, Palo Alto, Calif.

[73] Assignee: Raychem Corporation, Menlo Park, Calif.

[21] Appl. No.: 929,947

[22] Filed: Nov. 12, 1986

[51] Int. Cl.⁴ .............................................. B21D 53/12
[52] U.S. Cl. .......................... 29/148.4 A; 29/149.5 B; 29/149.5 C; 29/447; 29/DIG. 35; 264/27; 264/343; 403/273; 403/274
[58] Field of Search ..................... 29/149.5 B, 149.5 C, 29/148.5 R, 447, DIG. 25, DIG. 35, 148.4 R, 148.4 A; 264/230, 242, DIG. 71, 27, 343, 345

[56] References Cited

U.S. PATENT DOCUMENTS

| | | | |
|---|---|---|---|
| 881,471 | 3/1908 | Hoffmann | 29/148.4 A |
| 1,146,272 | 7/1915 | Neukirch | 29/148.4 A |
| 1,913,198 | 6/1933 | Geyer | 29/447 |
| 2,027,962 | 1/1936 | Currie | 264/263 X |
| 2,160,382 | 5/1939 | Heim | 29/447 |
| 2,783,528 | 3/1957 | Menne | 29/447 X |
| 3,591,669 | 7/1971 | Memory | 264/343 X |
| 3,879,828 | 4/1975 | Troost | 29/447 X |
| 4,126,758 | 11/1978 | Krumme | 29/447 X |
| 4,489,964 | 12/1984 | Kipp et al. | 29/447 X |
| 4,571,811 | 2/1986 | Pruvost | 29/447 X |
| 4,581,799 | 4/1986 | Bessinger | 29/148.4 R |
| 4,685,184 | 8/1987 | Satkamp | 29/148.4 R |

FOREIGN PATENT DOCUMENTS

| | | | |
|---|---|---|---|
| 40241 | 12/1909 | Fed. Rep. of Germany | 29/148.4 R |
| 730426 | 5/1955 | United Kingdom | 29/148.4 A |

OTHER PUBLICATIONS

Applications for 55-Nitonol.

Primary Examiner—P. W. Echols
Assistant Examiner—Andrew E. Rawlins
Attorney, Agent, or Firm—Timothy H. P. Richardson; Herbert G. Burkard

[57] ABSTRACT

The invention relates to novel bearings and methods for making bearings. The method comprises dimensionally recovering at least one race or rolling or sliding element such that a rolling element is free to roll or slide yet contained within the race.

20 Claims, 8 Drawing Sheets

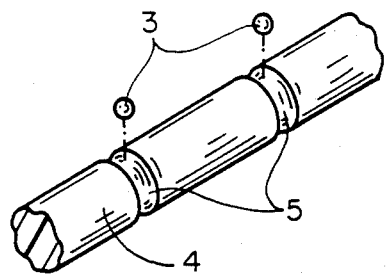
FIG_1A
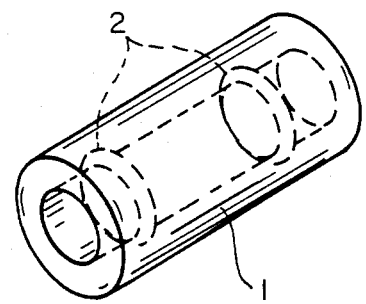
FIG_1B
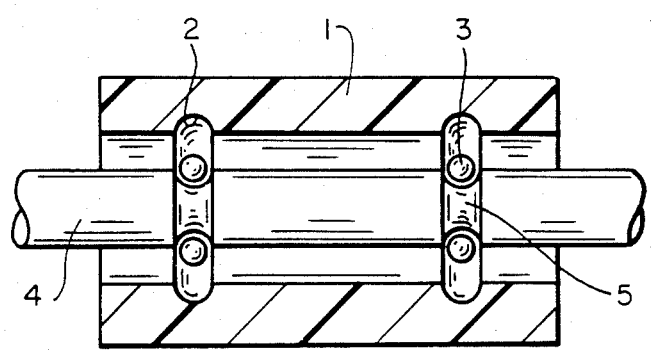
FIG_2

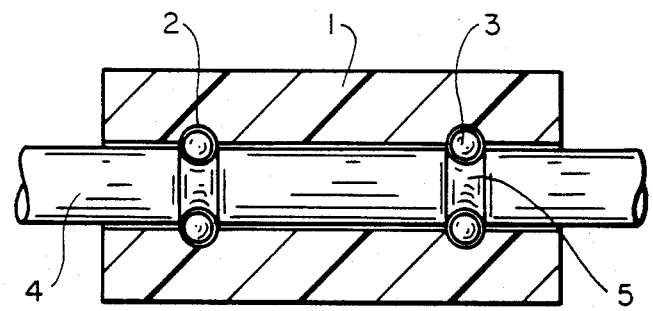
FIG_3
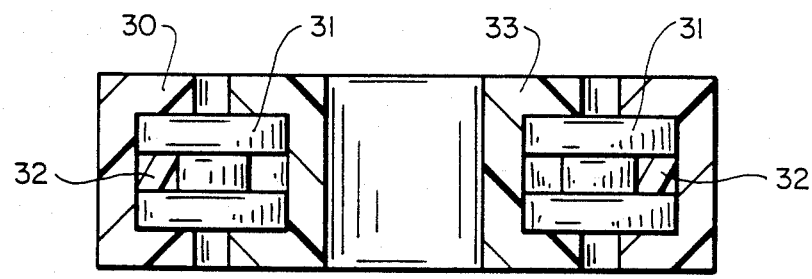
FIG_4
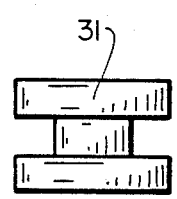
FIG_5

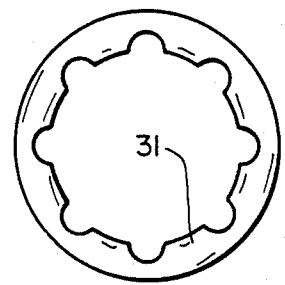
FIG_6
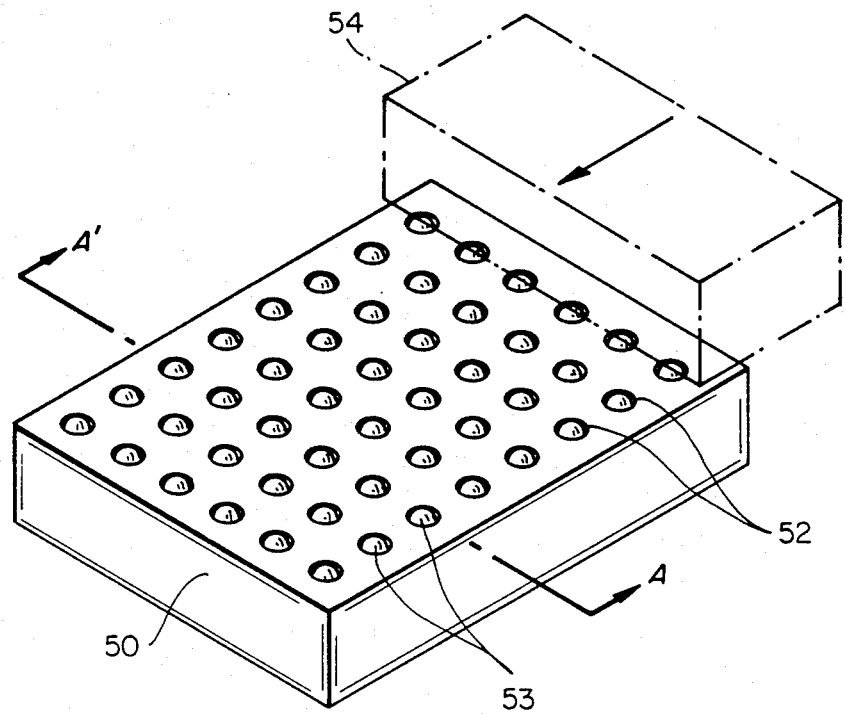
FIG_7A

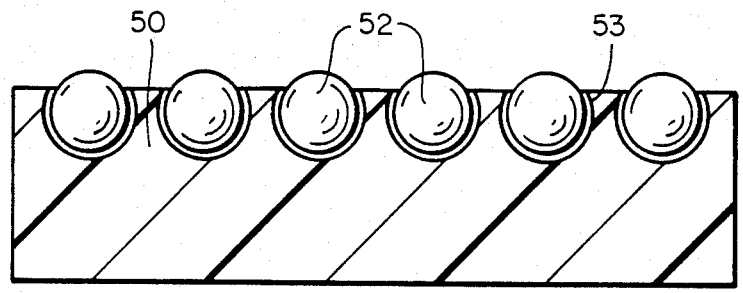
FIG_7B
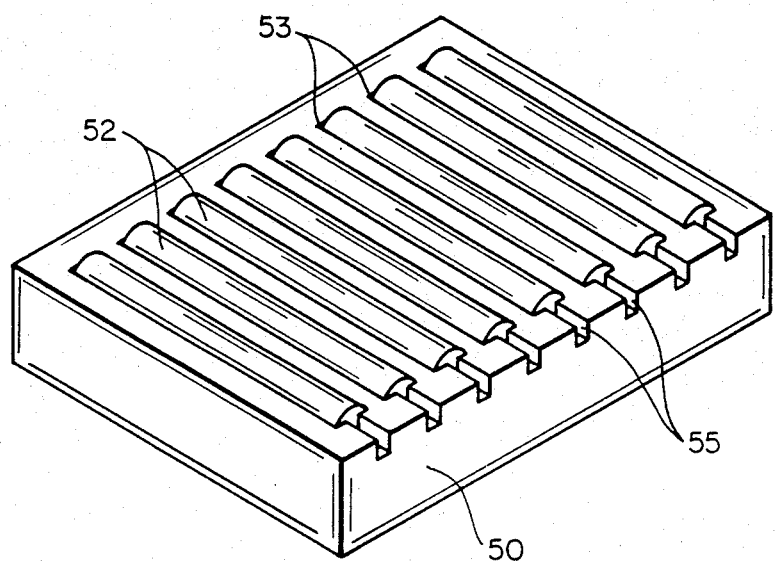
FIG_8

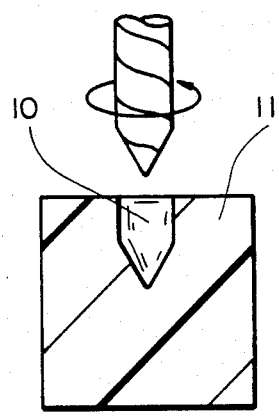
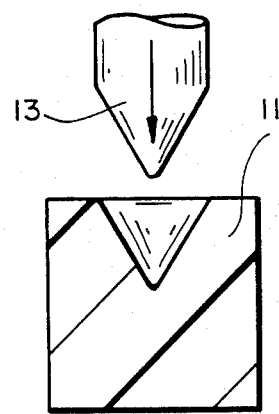
FIG_9A  FIG_9B
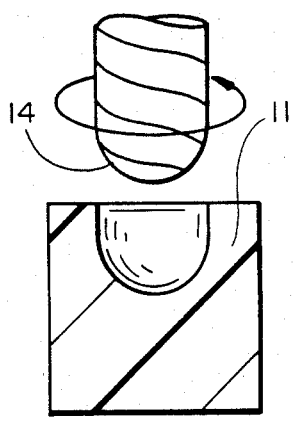
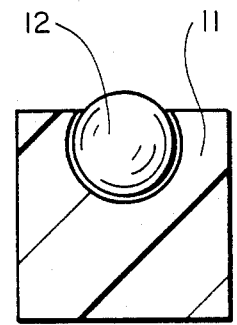
FIG_9C  FIG_9D

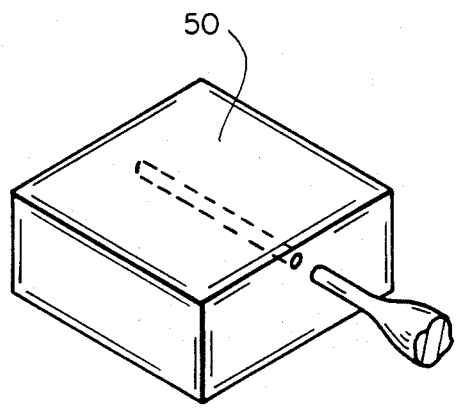
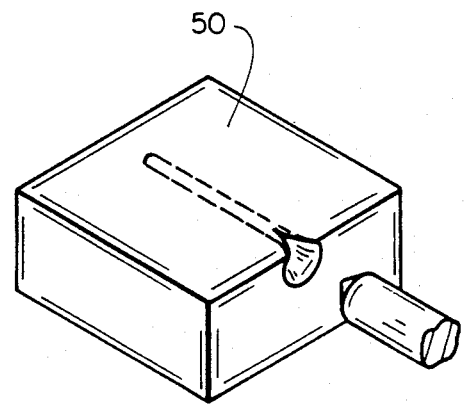
FIG_10A        FIG_10B
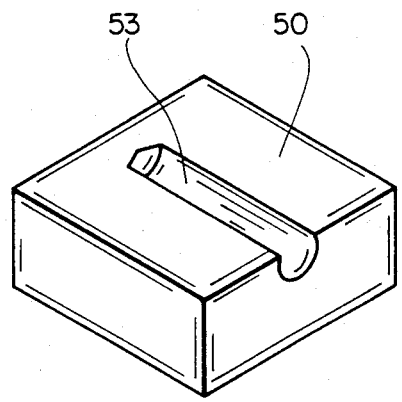
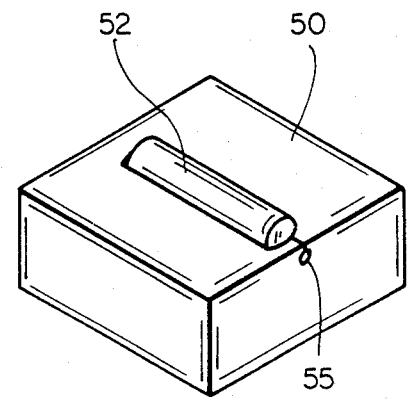
FIG_10C        FIG_10D

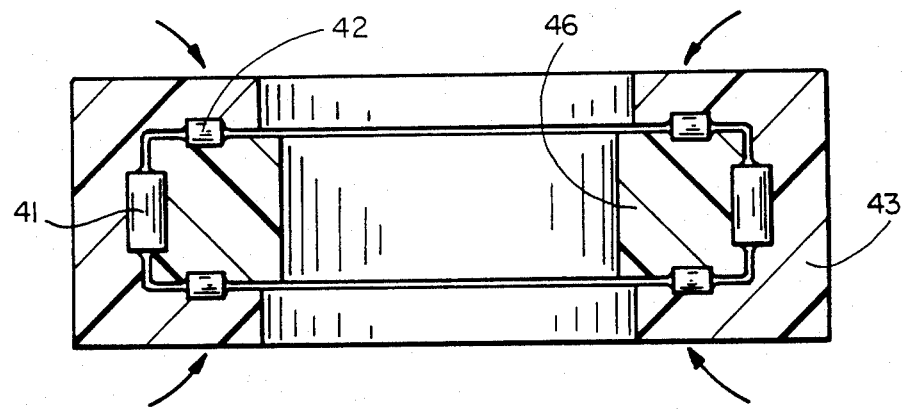
FIG_11
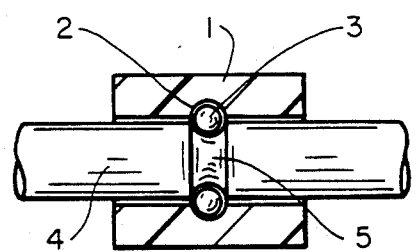
FIG_12
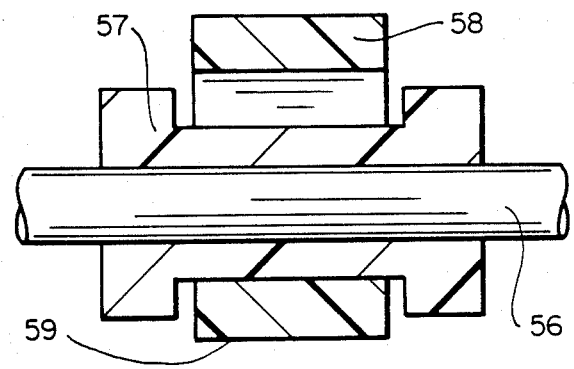
FIG_13

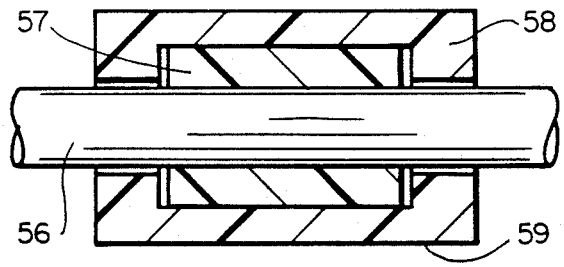
FIG_14
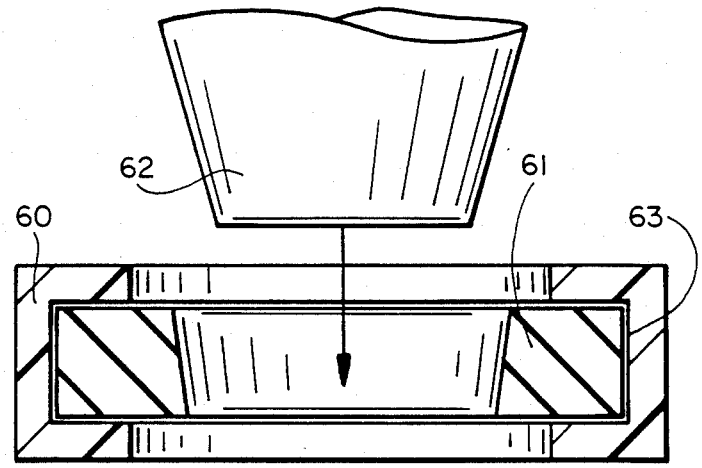
FIG_15
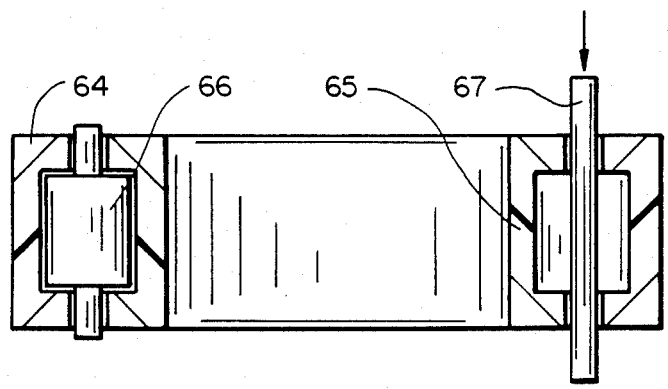
FIG_16

METHOD OF FORMING A BEARING BY DIMENSIONAL RECOVERY OF A RACE OR ROLLING ELEMENT

BACKGROUND OF THE INVENTION (a) The Invention

The invention relates to novel bearings and methods for making bearings. An increased thrust area, particularly useful if one or more components is polymeric, may be achieved thereby allowing a reduction in thrust pressure.

(b) Background Information

Bearings comprising rolling or sliding elements, such as balls or rollers, and at least one race comprising a surface upon which the rolling or sliding element can exert thrust are known to support or to reduce the wear of rotating shafts, or to transfer loads between rotating and stationary members with a minimum of friction. Rolling or sliding elements and races have each been made of a variety of materials such as metals (notably steel), ceramics and polymers. The Standard Handbook for Mechanical Engineers, Eighth Edition (1978), pages 8-136 to 8-142, the disclosure of which is incorporated herein by reference, provides a discussion of various bearings. Where the bearing is to be used near foods, water, corrosive materials etc., it may be desirable that the rolling or sliding elements and race comprise a polymeric material rather than a metal. Such a polymeric material may however be softer than a metal and may be able therefore to withstand a smaller maximum thrust. It is then highly desirable to provide a large thrust area. A larger thrust area will in general, however, require that the race conform to the shape of the rolling element to a greater extent than otherwise. This may in turn mean that the race traps the rolling or sliding element to a greater extent. (A ball bearing whose outer and inner races have flat bearing surfaces would not ordinarily trap the balls at all; the more the thrust area is increased by curving those surfaces around the balls, the more the balls are trapped.) This increase in the extent to which the balls are trapped clearly increases the difficulty in assembling the bearing, since the restriction that prevents the rolling or sliding elements leaving the race tends also to prevent their insertion. One way of facilitating assembly of a bearing is to provide sufficient tolerance between the rolling or sliding elements and other parts (for example inner and outer ring races) such that one part can be moved with respect to another creating a gap wider than the rolling or sliding elements to be inserted. However, this technique limits the number of elements that may be inserted, and therefore although the thrust area per element may be large, the total is small. Also the elements so inserted may easily fall out. Another method is to make the race in pieces and assemble those pieces around the rolling elements with screws, adhesives, or the like, or by interference fit. A problem with that type of race, however is its tendency to fail under a load and the difficulty of achieving precise tolerances. A further method involves providing a side tunnel into the race, that can admit the elements and then be closed. The resulting thrust area is, however, likely not to be smooth, causing abrasion of the elements.

We have now discovered that the phenomenon of dimensional-recovery may be used to overcome the otherwise inconsistent demands of ease or even possibility of assembly, and high thrust area or resistance to falling apart. We have discovered that the close tolerances required of the components of a bearing may be retained after the shaping, expansion and shrinking steps characteristic of the formation of dimensionally-recovered, particularly heat-recovered, articles.

Although heat recovery has been used in connection with bearings, it has not been used to solve the problems we address. The following documents may, however, be mentioned.

In French patent No. 2,408,362-A, a heat recoverable collar holds an inner bearing face around a skipping rope. Rolling elements and an outer race are then assembled in a conventional manner. The purpose of the bearing is of course to allow a freely rotatable connection to a handle so that the rope does not become twisted in use.

In Canadian patent No. 908,404 an adhesive which bonds a PTFE surface to an intermediate member around a rolling element, contracts on heating and therefore releases the rolling elements, allowing them to move freely.

In Canadian patent No. 887,365-A a heat shrinkable tape is applied to pressurize an epoxy tape which coats an outer surface of a metallic bearing shell in order to insulate it electrically. This is done to protect the bearing from splitting due to electrical current which may otherwise pass through it.

SUMMARY OF THE INVENTION

The invention provides a method of making a bearing which comprises:

(a) providing a race and a rolling or sliding element, said race and/or said rolling or sliding element being dimensionally-recoverable;

(b) placing the rolling or sliding element adjacent the race;

(c) causing dimensional recovery of the race and/or rolling or sliding element thereby trapping the rolling or sliding element with respect to the race.

The invention also provides a bearing comprising a race and a rolling or sliding element, the race having a hole or recess in a portion thereof of unitary construction within which hole or recess the rolling or sliding element is trapped such that the race and element cannot be separated without damage thereto.

The invention further provides a bearing comprising first and second race parts and a rolling or sliding element, the first and second race parts each having a portion of unitary construction, which portions together define a space within which the element is trapped, such that the first and second parts and the element cannot be separated without damage thereto.

Where reference is made to damage to the race or element we include, of course, damage that can be repaired. For example the components of the bearing could of course be separated by a subsequent expansion or other deformation step that reversed the dimensional-recovery. The point is that after such damage the material of the race or elements would have to be subjected to some further specific repair. We thus exclude from the invention the possibility of mere reassembly of undamaged parts or mere unassisted thermal contraction.

The rolling or sliding element may be of any suitable shape or material that allows a reduction in friction or improvement in wear resistance, for example in the case of a rolling element by at least in part substituting a rolling motion for a sliding motion. For example the rolling element may be a ball, or a roller which term includes cylindrical rollers, taper rollers, and curved rollers. In general, a bearing will include a plurality of rollers, for example 4–36, especially 8–24.

The race against which the rolling elements bear may be of various designs. For example a race comprising outer and inner race parts (often referred to as rings) may be provided, between which a plurality of rolling elements is trapped. The inner race part may carry a journal or shaft and the outer race part be secured within some fixed member with respect to which the journal is to rotate. The term race is also used herein to describe other means within which a rolling or sliding element may be trapped, for example an extended surface, for example a flat surface, over which loads are to be moved. The surface may have a series of recesses or holes therein within each of which is trapped a rolling element. The rolling elements allow a load to be rolled across the surface rather than slide; sliding friction may occur between the rolling elements and the interior of the recesses or holes where the area of contact is favourably small, but it may be avoided between the surface and rolling elements on the one hand, and the load on the other hand.

The present invention is applicable to all types of bearings for example linear, radial and thrust bearings. Also, the bearings may include single or multiple rows of rolling or sliding elements, as appropriate.

Other components may be present, in addition to the rolling or sliding element and the race. For example a separator may be provided to aid proper location of rolling elements, in a bearing having a plurality of rolling elements. For example in a ball bearing with inner and outer race parts, a separator may comprise a band of steel of diameter between that of the inner and that of the outer race parts. The band may have a series of equally spaced holes therein, each of diameter slightly greater than that of the balls. The separator thus serves to keep the balls equidistantly spaced around the races.

Whilst we have found that surprisingly small tolerances can be achieved in spite of the step of dimensional recovery, it may in some circumstances be desirable to reduce tolerances further. This may be done by providing stop means against which the race, for example, recovers. In this way, recovery is limited, and the final dimension depends not on the dimension before the deformation that renders the race recoverable, but rather on the dimension of the stop means. Such stop means may, for example, comprise two half-shells that may surround a plurality of rolling elements, themselves arranged around an inner race, and a dimensionally recoverable outer race may then be recovered around the half-shells. The half-shells may, of course, have been machined to a precise size.

The race and rolling elements may comprise any suitable material or materials. The invention is, however, particularly useful where a large thrust area is required, for example where soft materials are used such as plastics. Suitable plastics include ultra high molecular weight polyethylene (UHMWPE), fluoropolymer, e.g. polytetrafluoroethylene, nylon, an aromatic polyamide, and polyetherether ketones. Appropriate polymeric materials may be cross-linked to improve their dimensional-recoverability and/or to improve their performance in service. Suitable metals for any non-dimensionally-recoverable component include steel, such as carbon steel, and brass. Where a dimensionally-recoverable metal (known as shape memory metal) is used it may comprise for example a brass or titanium-nickel based alloy respectively. Other suitable materials comprise ceramics. A particularly useful combination comprises a polymeric race and metal rolling element, for example UHMWPE and steel. An advantage of such plastics materials in addition to a lack of corrosion is that, at low speeds at least, no lubrication is required which may be advantageous for example at a low temperatures where normal lubricants would not operate. Further advantages of plastics are their low radar image, and their lack of effect on electromagnetic radiation.

The materials may be chosen for their ability to be rendered dimensionally-recoverable, for their coefficients of friction, for their wear-resistance or aging-resistance etc. Various additives may be used to improve such properties. Examples of additives include graphite, molybdenum compounds such as disulphide, oils, greases, metallic zinc, polytetraflouroethylene powder, metallic lead, anitoxidants, carbon fibres, and carbon black, etc.

Such materials when dimensionally recoverable may be made substantially to change their dimensional configuration when subjected to a suitable treatment, particularly heating. We prefer in the case of polymeric materials, a recovery ratio (original dimension compared to final dimension) 5:1 or less, preferably 4:1 or less. Generally a ratio of 3:1 or less will be sufficient. In the case of metals a recovery of 4–8% will be typical. The recovery percentage in the case of polymeric materials is in general preferably at least 5%, especially 7%, more preferably 10%.

Usually heat-recoverable materials recover, on heating, towards an original shape from which they have previously been deformed, but the term "heat-recoverable" or "dimensionally-recoverable", as used herein, also includes a material that, on heating or other treatment, adopts a new configuration, even if it has not previously been deformed.

In their most common form, such materials comprises heat-shrinkable polymeric materials exhibiting the property of elastic or plastic memory as described, for example, in U.S. Pat. Nos. 2,027,962, 3,086,142, 3,597,372, 4,085,286, 4,177,446, 4,421,582 and 4,570,055 the disclosures of which are incorporated herein by reference. Attention is also drawn to U.S. Pat. No. 4,775,501, the disclosure of which is incorporated herein by reference, which discloses a heat-recoverable article comprising carbon black dispersed in either a sintered polymer or a very high molecular weight polymer, particularly polyethylene etc. having a molecular weight preferably greater than 150000. The present invention, I have surprisingly discovered, can make beneficial use of such materials and articles.

In the production of heat-recoverable materials, cross-linking may be carried out at any stage that will enhance the desired recoverability. One manner of producing a heat-recoverable article comprises shaping the polymeric material into the desired heat-stable form, subsequently cross-linking the polymeric material, heating the article to a temperature generally above the crystalline melting point or, for amorphous materials the softening point, as the case may be, of the polymer deforming the article, and cooling it, while in the deformed state so that the deformed state of the article is retained. In use, since the deformed state of the article is heat-unstable, application of heat will cause the article to assume or to approach its original heat-stable shape.

The invention has a wide range of fields of use, and the following may be regarded as of particular interest: in conjunction with foods or in chemical environments where corrosion of metal would cause problems; under water for example for motor bearings or for pulley bearings; in automobiles, for example window bearings exposed to water; in aeroplanes etc. where weight is to be kept low or where a significant radar image is to be avoided.

BRIEF DESCRIPTION OF THE DRAWINGS

FIGS. 1A and 1B are an exploded view of a double row ball bearing assembly of the invention;

FIG. 2 is a cross-sectional view of a double row ball bearing prior to dimensional recovery of the polymeric encapsulating race;

FIG. 3 is a cross-sectional view of a double row ball bearing after dimensional recovery of the encapsulating race;

FIG. 4 is a cross-sectional view of a roller bearing assembly of the invention;

FIG. 5 is a cross-sectional view of a rolling element and FIG. 6 is a cross-sectional view of a separator, each for use in the roller bearing assembly of FIG. 4;

FIGS. 7A, 7B and 8 show embodiments where the race comprises a substantially flat surface;

FIGS. 9A-9D and 10A-10D show installation of a rolling element in a race;

FIG. 11 is a cross-sectional view of a thrust bearing;

FIG. 12 shows a further embodiment;

FIGS. 13 and 14 show embodiments of the invention employing a sliding element;

FIG. 15 shows a method of making a dimensionally-recoverable race; and

FIG. 16 shows the use of a dimensionally-recoverable rolling element.

DETAILED DESCRIPTION OF THE INVENTION

FIG. 1 is an exploded view of a double row ball bearing comprising a dimensionally-recoverable, particularly radially heat-shrinkable, polymeric first, or outer, race 1, having a bearing surfaces 2 and ball rolling elements 3. A second race in the form of a journal or shaft 4 having bearing surfaces 5 is to be positioned within the outer race 1, where it can rotate freely on the balls 3. Race 1 is first made, for example by machining, in its desired final size and shape, such that it will trap balls 3 and such that it cannot simply be slid over journal 4 and balls 3 to assemble the bearing.

Next, race 1 is expanded radially, for example by heating it and forcing a tapered mandrel with in it, and then allowed to cool in its expanded state. (Whilst the race may be regarded as expanded "radially" it may be noted that the deformation of the material from which it is made may be a substantially circumferential, or hoop-wise, expansion.) The material of race 1 may be cross-linked before expansion. The race 1 in its expanded state is shown in FIG. 2, surrounding journal 4 and balls 3.

Dimensional-recovery of race 1 produces the configuration shown in FIG. 3 in which the balls 3 are trapped. It can be seen that this sequence of expansion, assembly, and recovery allows a large thrust area between each ball and the race and allows balls to be provided around the journal with as small a gap between them as desired. It can also be seen that the rolling elements are trapped between the first race 1 which is of unitary construction in conjunction with the journal or second race 4 which is also of unitary construction.

FIG. 4 shows a bearing comprising a dimensionally-recovered outer race 30, rolling elements 31, an inner race 33 and a separator or retaining ring 32. The function of the ring 32 is to keep the rolling elements equidistantly spaced around the race 33. A roller 31 is shown in FIG. 5 and the ring 32 is shown in FIG. 6.

FIGS. 7 and 8 show application of the invention to a race 50 of extended, here flat, surface.

In FIGS. 7A and 7B, which are an isometric view and a cross-section along line A—A', rolling elements in the form of balls 52 are provided trapped in holes 53. It can be seen that a load 54 can be slid across the resulting bearing without friction between the load 54 and the balls 52 or between the load 54 and the race 50. Friction will in general occur between the race 50 and the balls 52 but this need not be significant and in any case may be less than what would have existed between the load 54 and a simple flat surface. Two factors affect the friction between the balls 52 and the race 50: firstly, the shape of the holes 53 can be chosen to achieve a certain optimum contact area between balls 52 and race 50; and secondly, the materials of the balls 42 and race 50 can be chosen for a low coefficient of friction.

A variation on the design of FIG. 7 is shown in FIG. 8, where the rolling elements are cylindrical rollers 52. The rollers were inserted into recesses 53, by sliding longitudinally through an edge opening 55, which is shown partially closed after dimensional recovery, thereby trapping the rollers. The recesses 53 are reentrant or necked in transverse cross-section thus preventing the rollers 52 from leaving them in a direction transverse to their length, ie. vertically upwards as drawn.

FIGS. 9 and 10 show preferred method steps involved in the formation of the bearings of FIGS. 7 and 8 respectively.

In FIG. 9A a hole 10 is formed, for example drilled, in a block 11. The diameter of the hole should be slightly less than that of the ball 12 to be trapped, since it must later trap the ball 12. The depth of the hole should be slightly less than the diameter of the ball 12, since the ball is to protrude slightly above the surface in the finished bearing. The next step, illustrated in FIG. 9B, is to expand at least the rim of the hole, and this may conveniently be done by inserting into the hole a conical mandrel 13 as shown. Thus, the hole is made larger at its rim without removal of material. The new diameter should be slightly greater than that of the ball to be inserted. Then, that part of the hole below the rim is increased in size by removal of material, particularly by drilling, especially using a drill 14 with a substantially hemi-spherical tip in order that the base of the hole bear the correct relationship to the shape of the ball. It may be desirable that the radius of curvature of the base of the hole be greater than that of the ball in order to reduce the area of contact between them. It should be noted that this drilling step removes no (or substantially no) material from the rim of the hole.

The ball is then inserted in the hole, and the block 11 is heated or otherwise treated in order to cause dimensional recovery to produce the bearing shown in FIG. 9D. The block 11 which now forms a race for the ball 12 can be seen to be of unitary construction, trapping the ball 12 such that they cannot be separated without damage thereto.

FIGS. 10A–10D show an analogous sequence of steps for forming a bearing having cylindrical rolling elements, for example of the type shown in FIG. 8. In FIG. 10A, a hole of small diameter is drilled into a block 50 of material, such as cross-linked UHMWPE etc., along the center line of the desired position of the roller. Next, a mandrel having a tapered end, as also shown in FIG. 10A, is used to expand an end portion of the resulting hole, preferably while the block 50 is hot after which it is allowed to cool in its expanded state. The result is shown in FIG. 10B. A drill of larger size, as shown in FIG. 10B, is then used to increase the size of the hole along a length corresponding to that of the roller to be inserted. The smaller hole was drilled along a similar length to facilitate the drilling of the larger hole and/or insertion of the mandrel, but in some situations the small hole need extend no further than the part the mandrel is to expand, and may under favourable conditions be dispensed with entirely.

The larger hole should be of diameter slightly larger than that of the roller to be introduced, and it will be positioned such that it breaks the surface of the block 50 of material in order that the installed roller protrude above the surface. The result is an open recess 53 as shown in FIG. 10C. Since the centre of the hole was below the surface of the block 50, the now open recesses 53 will be reentrant or necked in transverse cross-section, and it should be thus reentrant to an extent sufficient to prevent the roller from leaving the recess in a direction perpendicular to its length.

The roller 52 is then slid longitudinally into the recess 53, and the edge portion of the block 50 that was expanded by the mandrel is dimensionally-recovered for example by heating to produce the configuration shown in FIG. 10D. The roller 52 is now trapped within the recess 53.

The bearing of FIG. 11 has rollers 41 to take radial thrust, and rollers 42 to take axial thrust. These two sets of rollers are trapped between an inner race 46 of unitary construction and an outer race 43 of unitary construction. Assembly of the bearing included the step of dimensionally-recovering the outer bearing both radially and axially as indicated by the arrows.

FIG. 12 shows a bearing similar to that of FIG. 3, but having a single row of rolling elements.

FIGS. 13 and 14 show embodiments of the invention where sliding elements, as opposed to the previously illustrated rolling elements, are employed. Whilst sliding elements will not in general achieve such a great reduction in friction as rolling elements, they may be preferably for some applications. FIG. 13 shows a shaft 56, an in cross-section fixed thereto a race 57. A sliding element 58 having the form of a ring is slid over the race and dimensionally recovered such that it becomes trapped. The top half of the figure shows sliding element 58 before recovery, and the bottom half shows it after recovery. The sliding element is able to rotate with respect to the race 57, and thus its outer surface 59 may be fixed with respect to some other member (such as a support for the shaft 56) with respect to which the shaft is to rotate. Friction between the shaft and such other member has therefore been replaced by friction between the race 57 and the sliding member 58, and the materials from which they are made may be chosen for their coefficient of friction or wearing properties, or electrical insulation.

FIG. 14 illustrates a similar embodiment to that of FIG. 13, except that the sliding member here extends (partially) around the race (which is retained, for consistency, for that member fixed to the shaft 56) in an axial as well as circumferential direction. This embodiment may be useful for use as a thrust bearing.

A method of making a dimensionally-recoverable race is illustrated in FIG. 15. Whilst this figure illustrates a race of the type used as an outer ring in a ball or roller bearing, such as that illustrated in FIG. 4, the principles involved in the present method may be applied to bearings of other designs. The race 60 is shown in its initial form before expansion or other deformation that is to render it dimensionally-recoverable. It is desirable that on recovery the race returns substantially exactly to its designed configuration or to a configuration close to it, and therefore the configuration shown may also be regarded as that desired in the finished bearing. In order that recovery be predictable it is desirable that care be taken during the expansion step. We prefer that deformation be carried out at the lowest temperature consistent with avoidance of the need for excessive expansion forces. Higher temperatures may cause the original or predetermined pre-deformation configuration not to be perfectly realized on recovery, and may result in some oxidation or other degradation. For some polymeric materials, deformation temperatures of 130°–180° C., especially 150°–160° C. will be preferred.

In order to achieve a predictable recovery, it is preferred that the material be deformed only in the dimension and at the location necessary, generally radially outwards in the case of a race in the form of a ring. In order to achieve this, we prefer that an expansion force be applied locally (by which we mean primarily, and preferably substantially only), to a base of a hole or recess of the race within which a rolling (or sliding) element lies.

Thus, in the embodiment illustrated a spacer, element 61 is placed in the recess in the race 60, such that a mandrel 62, driven to the right as illustrated, applies a force radially outwards to the member 61 and thereby to the base 63 that it engages. Means other than a mandrel may be used to provide the force for expansion, for example a radially expanding barrel or radially expanding series of mechanical fingers.

The spacer element 61 is preferably formed from a stiff rubber, or a UHMWPE or other suitable material. If it is reasonably easily deformed it may be provided in the form of an unbroken ring, since it will be able to be deformed to position it within the recess, and it will be able to deform during the expansion step. Alternatively, it may be formed as a split ring or as two or more pieces. It is not necessary that the spacer member fill the recess, either over its entire circumference or axially, and instead it could be provided only at selected positions around the recess. The spacer member may be separate from (as illustrated) or attached to or integral with an expansion tool, particularly an expanding barrel or series of mechanical fingers.

It can be seen that by use of the spacer member, the desired geometrical shape of the race 60 will be substantially retained; the only change preferably being an overall uniform radial expansion. If, however, the expansion tool bore directly against the inwardly directed flanges that define the walls of the recess, then expansion would result in the shape of the recess changing, which may cause difficulties during assembly, for example due to incompleteness or unpredictability of recovery.

FIG. 16 shows the use of a dimensionally-recoverable rolling element. A bearing comprises an outer race 64, an inner race 65 and a plurality of rolling elements 66 (one only is shown) between them. The bearing is assembled by placing the inner race 65 within the outer race 64. Dimensionally-recoverable rolling elements 67, here having the configuration of rods, are slid axially, as shown by the arrow, between the two races, 64, 65. When in approximately the correct position, they are caused dimensionally to recover, for example by heating. In the embodiment shown, the rods 67 recover to the configuration of rolling element 66.

The rods 67 may be made by any suitable method, for example as follows. An optionally cross-linked polymeric material is machined to the shape shown as rolling element 66. It is then heated for example to a temperature above the crystalline melting point of the material, and axially stretched until its diameter is sufficiently small that it may be inserted between the two races (it need not become cylindrical as shown at 67). As an alternative to machining rolling elements of shape 66, a moulding technique may be used, in which case cross-linking if desired should be carried out after moulding. Such recoverable rolling elements may also be used in other bearings, such as those of the designs of FIGS. 8 and 10, in which case the race need not be dimensionally-recoverable.

Dimensional-recovery, which causes the rod 67 to assume the configuration of rolling element 66, may be carried out in any suitable way. For example a hot-air gun or torch may be used, although more uniform results may be achieved by positioning the races plus rolling elements in an oven, heated by any suitable means including microwave heating.

In general, dimensional-recovery may be carried out electrically. Thus, the race or rolling or sliding element may be heat-recoverable and electrically conductive such that when a voltage is applied to the race or element a current flows through it generating the heat required for recovery. The invention, thus provides a race or a rolling or sliding element that is heat-recoverable and includes self-contained electrical heating means. By "heating means" in this context we mean the means that immediately produces heat, generally from another form of energy such as electricity. An example is a resistive material. The ultimate source of energy need not be present, although it may be present, for example in the case of chemical reactants that can be caused to generate heat. In the case of a race or rolling or sliding element comprising a polymeric material such conductivity may be achieved by adding a conductive material, for example carbon black, to a base polymer. If desired the material may have a positive temperature coefficient of resistance such that its heating is self-regulating. An advantage of such electrical heating is that localized recovery, without heat damage to other components, can be achieved. A source of electrical power may be connected to the part to be recovered by means of clips or other electrodes such that heating occurs only between the clips. Clips could for example be connected to opposite ends of the rod 67 of FIG. 16 to cause localized heating of that rod.

DESCRIPTION OF PREFERRED EMBODIMENTS

The following examples further illustrate the invention but are not intended to be limiting. One skilled in the art would, after reading this specification, be able to make selections of recoverable polymers or other materials, and of designs of races and rolling elements.

EXAMPLE 1

A Double Row Ball Bearing

A bearing of the design of FIGS. 1-3 was formed from an outer race, an inner race and fourteen rolling elements in the form of balls. The races were machined from an UHMWPE ram extruded rod-stock (the polymer, HOSTALEN Gur-412, trade mark, was supplied by the American Hoechst Corp.) to shapes depicted in FIG. 1. The diameter of the inner race was smaller than the inside diameter of the outer race, so that no direct contact between the races occurs after assembly. Two parallel circular grooves were machined on the surface of the inner race and on the inside surface of the outer race. The gap between the grooves was the same for each race. The depth of the grooves was designed to accommodate after recovery $\frac{1}{4}''$ (0.625 cm) steel balls between the races loosely, but without allowing the balls to leave the race, so that a smooth rolling action was obtained. The radius of each groove was slightly larger than that of the steel ball. The races were cross-linked by means of a cobalt 60 source, although chemical cross-linking may be preferred for some applications. The outer race was then heated to 140° C., and expanded so that its inside diameter increased by about 25%. Fourteen steel balls were glued, or otherwise temporarily held in place, on the grooves of the inner race. The inner race was placed inside the expanded outer race so that the grooves on each race were aligned, as shown in FIG. 2. The outer race was heated to about 150° C., causing its shrinkage and trapping the balls in the grooves between the races. After cooling to room temperature, the tolerance between the balls and the race was close enough to keep the balls in the race, but loose enough to let them roll freely. FIG. 3 is a cross-section of the assembled bearing.

EXAMPLE 2

A Roller Bearing

A bearing of the design of FIGS. 4-6 was formed from an outer race, an inner race, a cage ring and a set of rolling elements in the form of rollers. All the components were machined from UHMWPE, (HOSTALEN Gur-413, trade mark) stock, and then chemically cross-linked. The cage ring (see FIG. 6) was expanded radially so that it was possible to place it around the rollers while they were located in the groove of the inner race. Each roller was located such that its central neck portion engaged an indent around the inner surface of the ring, and the ring was then shrunk trapping the rollers but allowing their free rotation. The outer race was expanded so that it could be slid over the rollers now mounted on the inner race, after which it was shrunk so that it closed around the rollers, but again free rotation was still possible.

I claim:
1. A method of making a bearing, which comprises:
   (a) providing a race and a rolling or sliding element, said race being dimensionally-recoverable and comprising a cross-linked polymeric material;
   (b) placing the rolling or sliding element adjacent the race; and
   (c) heating the race to cause dimensional recovery thereof, thereby trapping the rolling or sliding element with respect to the race, said recovery being in itself sufficient to cause the race and the rolling or sliding element to assume their finished dimensions with respect to each other.

2. A method according to claim 1, in which a plurality of rolling elements is provided and in which the race comprises an inner race part and a dimensionally-recoverable outer race part, step (c) comprising dimensionally-recovering the outer race part.

3. A method according to claim 1 in which a plurality of rolling elements each comprising a ball is provided, and in which the race has a substantially flat surface having a plurality of holes therein, step (b) comprises placing the balls in the holes, and in step (c), the recovery of the race traps the balls in the holes.

4. A method according to claim 1 in which a plurality of rolling elements each comprising a roller is provided, and in which the race has a substantially flat surface having a plurality of recesses therein, step (b) comprises placing the rollers in the recesses, and in step (c) the recovery of the race traps the rollers in the recesses.

5. The method according to claim 1 wherein the rolling or sliding element is composed of a metal.

6. A method according to claim 1 wherein the polymeric material is a sintered polymeric material.

7. A method according to claim 6 wherein the polymeric material is sintered ultrahigh molecular weight polyethylene.

8. A method according to claim 7 wherein the rolling or sliding element is composed of a metal.

9. A method according to claim 1 wherein the race is dimensionally recovered against a stop means in step (c).

10. A method according to claim 9, in which a plurality of rolling elements is provided, in which the race comprises an inner race part and a dimensionally-recoverable outer race part, and in which step (c) comprises heating the outer race part to cause dimensional recovery thereof.

11. A method of making a bearing, which comprises:
(a) providing a race and a rolling or sliding element, said race being dimensionally-recoverable and comprising a shape memory metal;
(b) placing the rolling or sliding element adjacent the race; and
(c) heating the race to cause dimensional recovery thereof, thereby trapping the rolling or sliding element with respect to the race, said recovery being in itself sufficient to cause the race and the rolling or sliding element to assume their finished dimensions with respect to each other.

12. A method of making a bearing, which comprises:
(a) providing a race and a rolling or sliding element, said race and/or said rolling or sliding element being dimensionally-recoverable by heat;
(b) placing the rolling or sliding element adjacent the race; and
(c) heating the race and/or rolling or sliding element to cause dimensional recovery thereof, thereby trapping the rolling or sliding element with respect to the race, the recovery being in itself sufficient to cause the race and the rolling or sliding element to assume their finished dimensions with respect to each other.

13. A method according to claim 12, in which the race comprises a cross-linked polymeric material which is recovered by heating in step (c).

14. A method according to claim 13 wherein the rolling or sliding element is composed of a metal.

15. A method according to claim 13 wherein the polymeric material is a sintered polymeric material.

16. A method according to claim 15 wherein the polymeric material is sintered ultrahigh molecular weight polyethylene.

17. A method according to claim 16 wherein the rolling or sliding element is composed of a metal.

18. A method according to claim 12 in which the race comprises a shape-memory metal which is recovered by heating in step (c).

19. A method according to claim 12 wherein the race is dimensionally recovered against a stop means in step (c).

20. A method of making a bearing, which comprises:
(a) providing a race and a rolling or sliding element, said rolling or sliding element being dimensionally-recoverable and being composed of a cross-linked polymeric material;
(b) placing the rolling or sliding element adjacent the race; and
(c) causing dimensional recovery of the rolling or sliding element thereby trapping the rolling or sliding element with respect to the race.

* * * * *